United States Patent
Hwang et al.

(10) Patent No.: US 10,855,423 B2
(45) Date of Patent: *Dec. 1, 2020

(54) ENHANCED CHANNEL ESTIMATION METHOD AND USER EQUIPMENT PERFORMING THE SAME

(71) Applicant: LG ELECTRONICS INC., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/212,314

(22) Filed: Dec. 6, 2018

(65) Prior Publication Data

US 2019/0116011 A1 Apr. 18, 2019

Related U.S. Application Data

(63) Continuation of application No. 15/394,471, filed on Dec. 29, 2016, now Pat. No. 10,326,572.

(30) Foreign Application Priority Data

Dec. 8, 2016 (KR) .................. 10-2016-0166837

(51) Int. Cl.
*H04L 5/00* (2006.01)
*H04L 25/02* (2006.01)
(Continued)

(52) U.S. Cl.
CPC ........ *H04L 5/0048* (2013.01); *H04L 25/0204* (2013.01); *H04L 25/0228* (2013.01);
(Continued)

(58) Field of Classification Search
None
See application file for complete search history.

(56) References Cited

U.S. PATENT DOCUMENTS

2012/0033630 A1 2/2012 Chung et al.
2013/0315089 A1 11/2013 Cedergren et al.
(Continued)

OTHER PUBLICATIONS

3rd Generation Partnership Project, "Technical Specification Group Radio Access Network; Evolved Universal Terrestrial Radio Access (E-UTRA); Physical Channels and Modulation (Release 10)", 3GPP TS 36.211 V10.4.0, Dec. 2011, 101 pages.
(Continued)

*Primary Examiner* — Yaotang Wang
(74) *Attorney, Agent, or Firm* — Lee Hong Degerman Kang Waimey

(57) ABSTRACT

One disclosure of the present specification provides a channel estimation method of a user equipment (UE). The method comprising: acquiring a first channel estimate based on a first reference signal allocated to a first resource element of a subframe received from a base station; and removing a second reference signal from a second resource element of the subframe when an additional reference signal is not required, and decoding a data channel multiplexed in the second resource element using a result of channel estimation of an entire channel performed based on the first channel estimate. The second reference signal and the data channel may be multiplexed in the second resource element.

10 Claims, 18 Drawing Sheets

Related U.S. Application Data

(60) Provisional application No. 62/307,588, filed on Mar. 14, 2016.

(51) Int. Cl.
   H04W 52/24 (2009.01)
   H04B 7/06 (2006.01)
   H04L 5/14 (2006.01)

(52) U.S. Cl.
   CPC ......... *H04W 52/241* (2013.01); *H04B 7/0626* (2013.01); *H04L 5/001* (2013.01); *H04L 5/0023* (2013.01); *H04L 5/0073* (2013.01); *H04L 5/1469* (2013.01)

(56) References Cited

U.S. PATENT DOCUMENTS

| | | | |
|---|---|---|---|
| 2014/0098696 A1 | 4/2014 | Park | |
| 2016/0088512 A1* | 3/2016 | Bergstrom | ........ H04W 28/0263 370/330 |
| 2016/0242083 A1 | 8/2016 | Guan et al. | |
| 2017/0238312 A1* | 8/2017 | Chen | ..................... H04L 5/0048 370/329 |
| 2017/0264407 A1 | 9/2017 | Hwang et al. | |

OTHER PUBLICATIONS

3rd Generation Partnership Project, "Technical Specification Group Radio Access Network; Evolved Universal Terrestrial Radio Access (E-UTRA); Physical Channels and Modulation (Release 8)", 3GPP TS 36.211 V8.2.0, Mar. 2008, section 6.10.1., pp. 50-53 (6 pages provided).

3rd Generation Partnership Project, "Technical Specification Group Radio Access Network; Evolved Universal Terrestrial Radio Access (E-UTRA); Physical Channels and Modulation (Release 10)", 3GPP TS 36.211 V10.1.0, Mar. 2011, 103 pages.

United States Patent and Trademark Office U.S. Appl. No. 15/394,471, Office Action dated Apr. 4, 2018, 20 pages.

* cited by examiner

FIG. 12
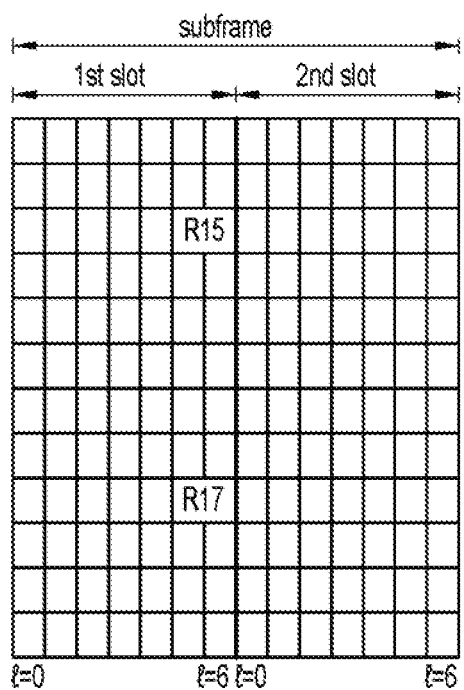
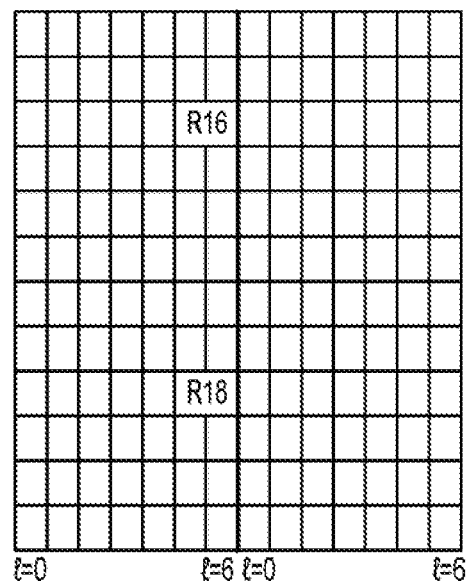
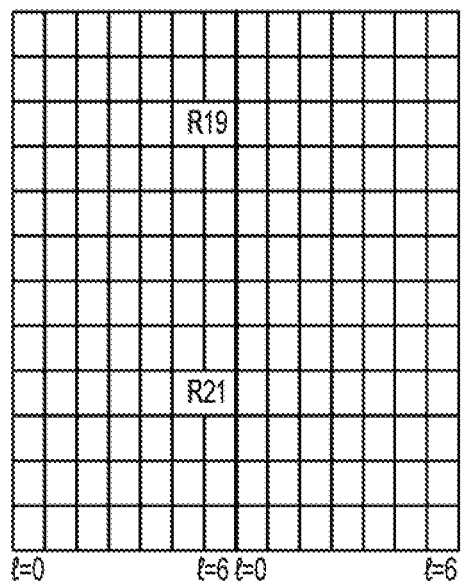
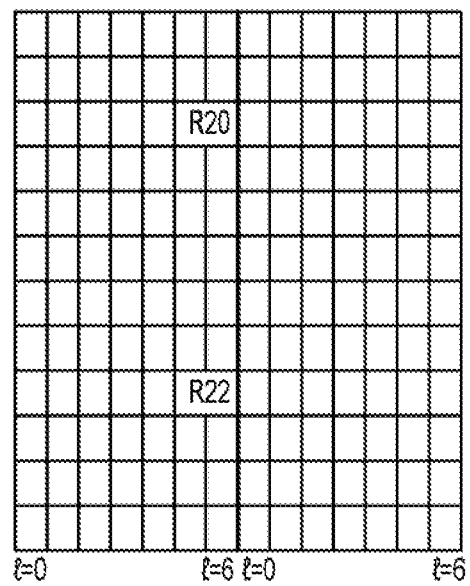

FIG. 14
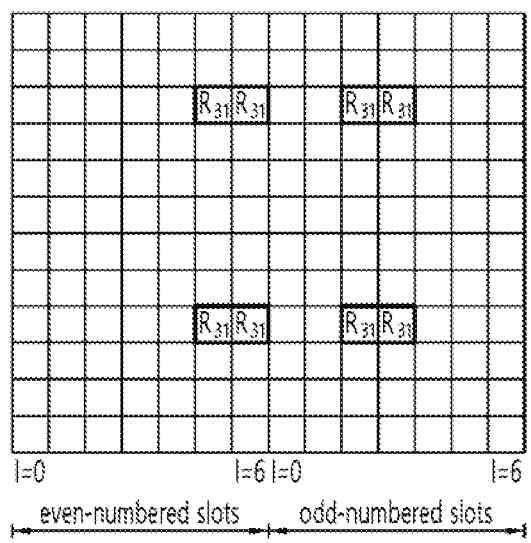
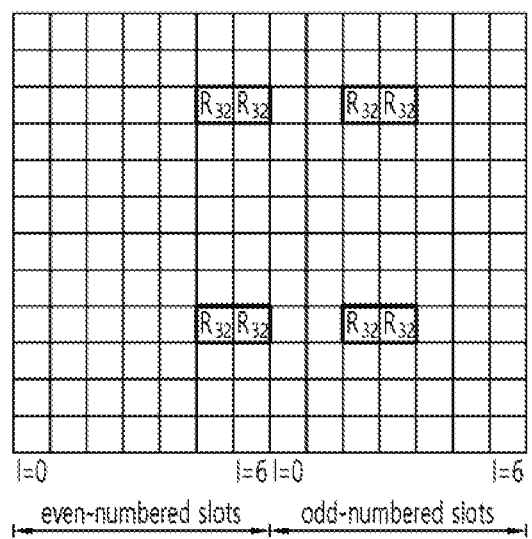
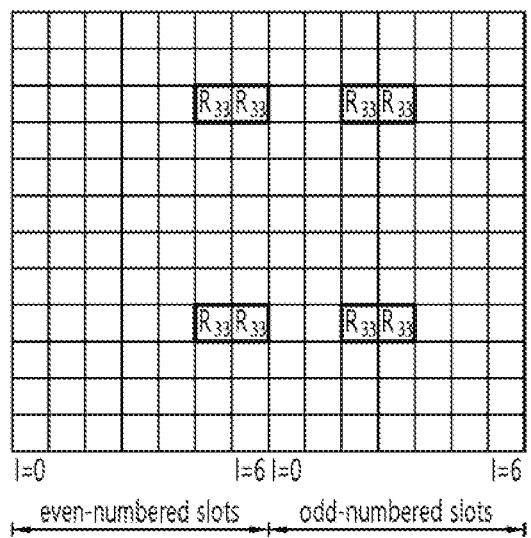
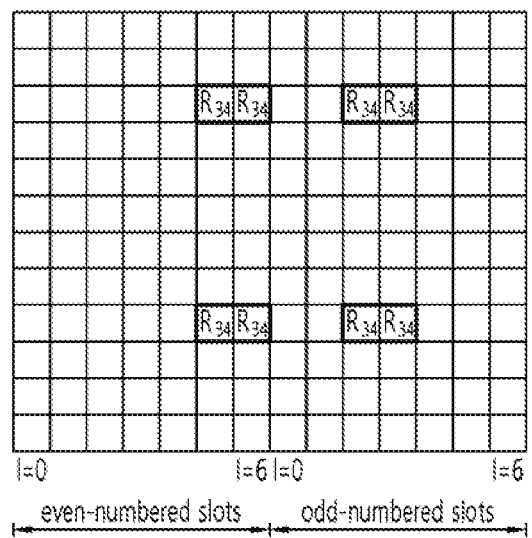

ENHANCED CHANNEL ESTIMATION METHOD AND USER EQUIPMENT PERFORMING THE SAME

CROSS-REFERENCE TO RELATED APPLICATIONS

This application is a continuation of U.S. patent application Ser. No. 15/394,471, filed on Dec. 29, 2016, now U.S. Pat. No. 10,326,572, which claims the benefit of earlier filing date and right of priority to U.S. Provisional Application No. 62/307,588, filed on Mar. 14, 2016, and also claims the benefit of Korean Patent Application No. 10-2016-0166837, filed on Dec. 8, 2016, the contents of which are all hereby incorporated by reference herein in their entirety.

BACKGROUND OF THE INVENTION

Field of the Invention

The present invention relates to wireless communications.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink.

Such LTE may be generally divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, data is easily distorted or changed while being transmitted through a radio channel. Therefore, a reference signal is needed to demodulate such transmission information without error. A reference signal is a signal known in advance between a transmitter and a receiver and is transmitted along with transmission information. Since transmission information transmitted from a transmitter experiences a corresponding channel in each transmitting antenna or layer, a reference signal may be allocated for each transmitting antenna or layer. A reference signal for each transmitting antenna or layer may be distinguished using a resource, such as time, a frequency, and a code.

However, when a user equipment (UE) located in a fast-moving environment or an environment with a poor channel state receives data based on only a conventionally defined reference signal, the UE has a limitation of being unable to exhibit proper data receiving performance due to deteriorated channel estimation. Therefore, required is a channel estimation solution for a fast-moving environment or an environment with a poor channel state.

SUMMARY OF THE INVENTION

One disclosure of the present specification is to provide a method for performing enhanced channel estimation in a fast-moving environment or an environment with a poor channel state.

Another disclosure of the present specification is to provide a user equipment that is capable of performing enhanced channel estimation in a fast-moving environment or an environment with a poor channel state.

To achieve the foregoing aspect, one embodiment of the present invention provides a channel estimation method of a user equipment (UE). The method comprising: acquiring a first channel estimate based on a first reference signal allocated to a first resource element of a subframe received from a base station; and removing a second reference signal from a second resource element of the subframe when an additional reference signal is not required, and decoding a data channel multiplexed in the second resource element using a result of channel estimation of an entire channel performed based on the first channel estimate. The second reference signal and the data channel may be multiplexed in the second resource element.

The decoding of the data channel comprises determining whether the additional reference signal is required based on an indicator received through a radio resource control (RRC) signal.

The method may further comprising receiving information on the second reference signal from the base station. The decoding of the data channel comprises removing the second reference signal from the second resource element using the information on the second reference signal.

When the additional reference signal is required, the decoding of the data channel may comprises performing the channel estimation of the entire channel based on a second channel estimate acquired based on the second reference signal and the first channel estimate.

When the second reference signal is transmitted through power boosting as compared with the first reference signal, the channel estimation of the entire channel may be performed by applying a weight according to a level of the power boosting to the second channel estimate. The channel estimation of the entire channel may be performed by equally applying a weight to the first channel estimate and the second channel estimate.

The method may further comprising performing radio resource measurement (RRM) using only the first reference signal even when the additional reference signal is required.

To achieve the foregoing aspect, another embodiment of the present invention provides a user equipment (UE) for performing channel estimation. The UE comprising: a radio frequency (RF) unit to transmit and receive a radio signal; and a processor to control the RF unit. The processor controls the RS unit to acquire a first channel estimate based on a first reference signal allocated to a first resource element of a subframe received from a base station; and removes a second reference signal from a second resource element of the subframe when an additional reference signal is not required, and decodes a data channel multiplexed in the second resource element using a result of channel estimation of an entire channel performed based on the first channel estimate. The second reference signal and the data channel may be multiplexed in the second resource element.

According to the disclosure of the present specification, enhanced channel estimation may be performed in a fast-moving environment or an environment with a poor channel state. Further, a decrease in transmission rate caused by the overheads for the transmission of a reference signal may be minimized.

BRIEF DESCRIPTION OF THE DRAWINGS

FIG. 12 illustrates an example of a structure of the CSI-RS.

FIG. 14 illustrates an RS structure for an antenna port of A-RS structure type 1 according to one disclosure of the present specification.

DESCRIPTION OF EXEMPLARY EMBODIMENTS

Figure 1:
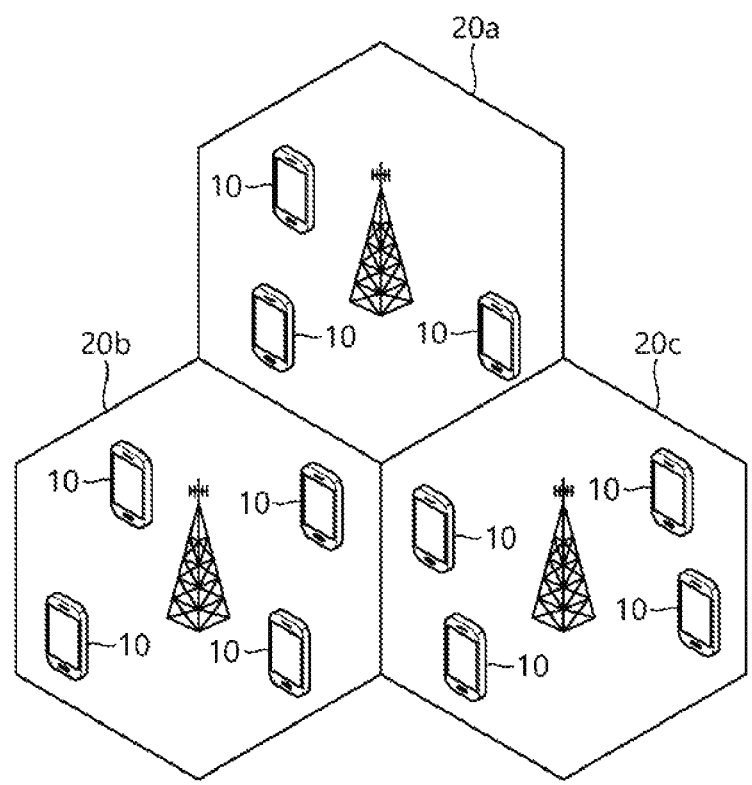
FIG. 1 shows a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 Shows a Wireless Communication System.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10.

In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
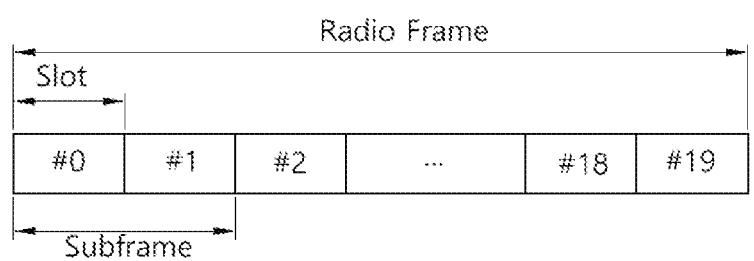
FIG. 2 shows a downlink radio frame structure according to FDD of 3rd generation partnership project (3GPP) long term evolution (LTE).

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
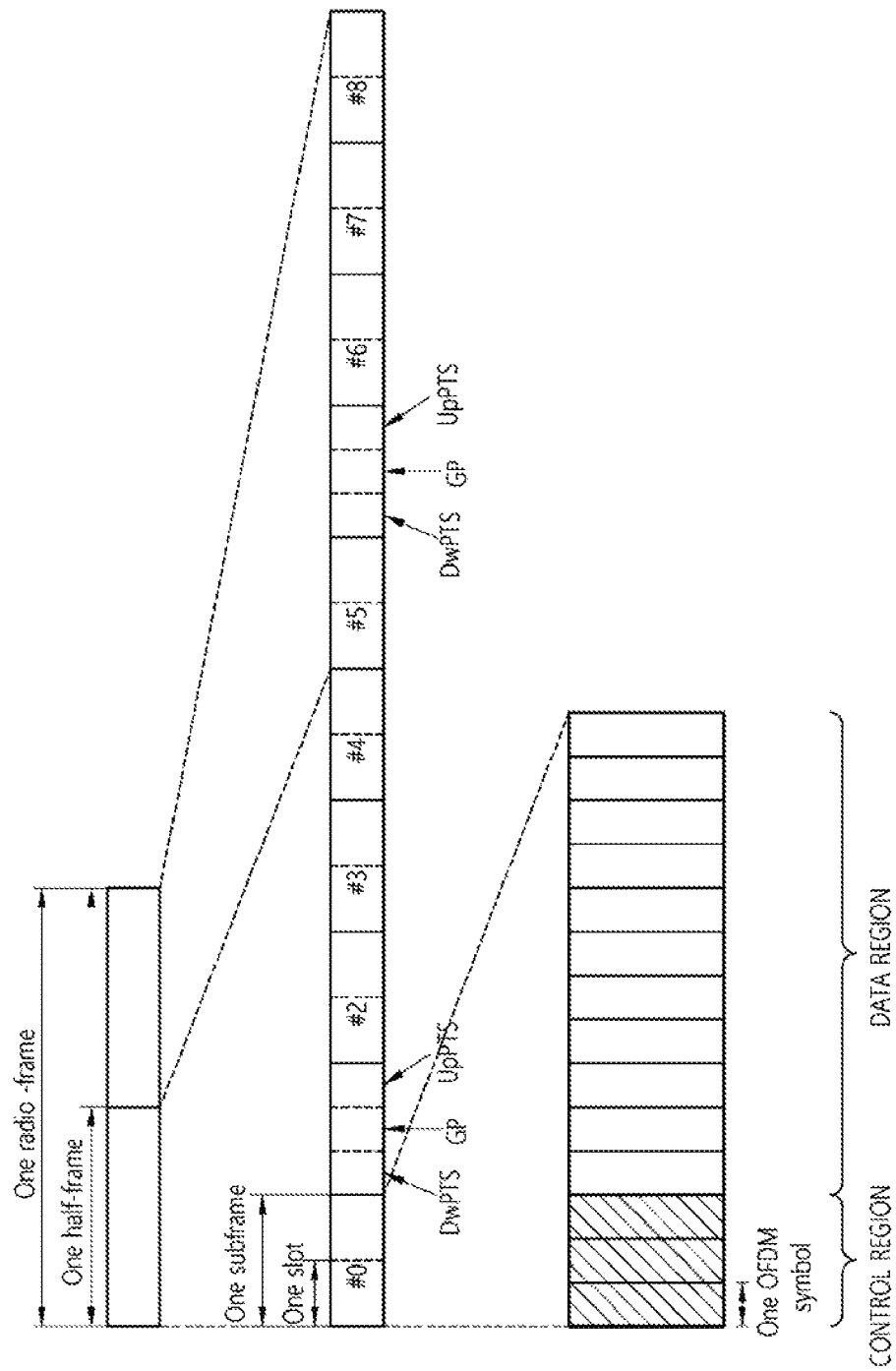
FIG. 3 shows an example of a resource grid for one uplink or downlink slot in 3GPP LTE.

FIG. 3 Shows an Example of a Resource Grid for One Uplink or Downlink Slot in 3Gpp Lte.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). In the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Con-figuraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
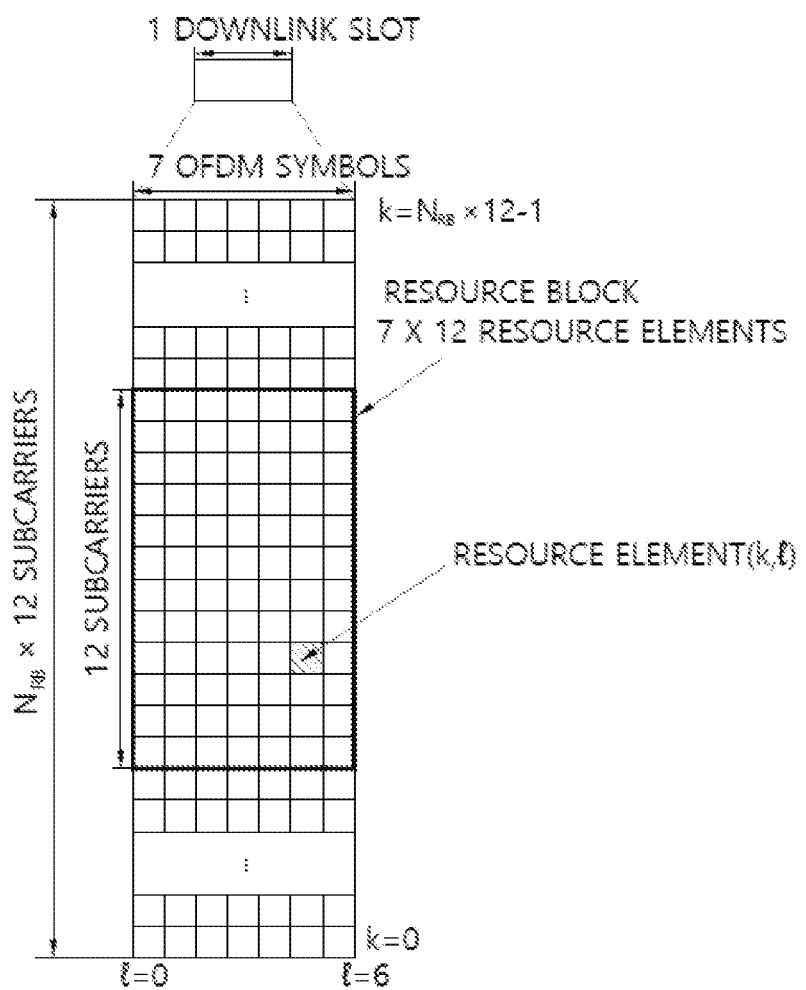
FIG. 4 illustrates an example resource grid for one uplink or downlink slot in 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
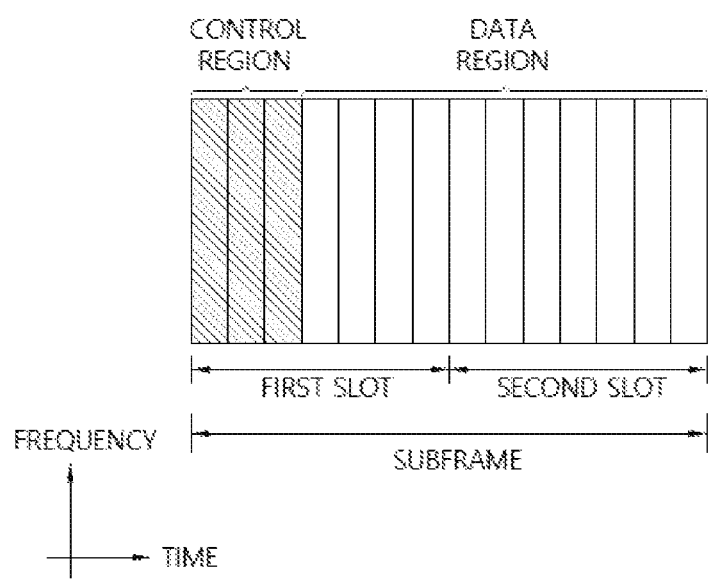
FIG. 5 illustrates the architecture of a downlink sub-frame.

FIG. 5 Illustrates the Architecture of a Downlink Sub-Frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH)

and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 2

| Transmission mode | DCI format | Search space | Transmission mode of PDSCH according to PDCCH |
|---|---|---|---|
| Mode 1 | DCI format 1A | Common and UE-specific | Single antenna port, port 0 |
|  | DCI format 1 | UE-specific | Single antenna port, port 0 |
| Mode 2 | DCI format 1A | Common and UE-specific | Transmission diversity |
|  | DCI format 1 | UE-specific | Transmission diversity |
| Mode 3 | DCI format 1A | Common and UE-specific | Transmission diversity |
|  | DCI format 2A | UE-specific | CDD (Cyclic Delay Diversity) or Transmission diversity |
| Mode 4 | DCI format 1A | Common and UE-specific | Transmission diversity |
|  | DCI format 2 | UE-specific | Closed-loop spatial multiplexing |
| Mode 5 | DCI format 1A | Common and UE-specific | Transmission diversity |
|  | DCI format 1D | UE-specific | MU-MIMO(Multi-user Multiple Input Multiple Output) |
| Mode 6 | DCI format 1A | Common and UE-specific | Transmission diversity |
|  | DCI format 1B | UE-specific | Closed-loop spatial multiplexing |
| Mode 7 | DCI format 1A | Common and UE-specific | Single antenna port, port 0 if the number of PBCH transmission port is 1, otherwise Transmission diversity |
|  | DCI format 1 | UE-specific | Single antenna port, port 5 |
| Mode 8 | DCI format 1A | Common and UE-specific | Single antenna port, port 0 if the number of PBCH transmission port is 1, otherwise Transmission diversity |
|  | DCI format 2B | UE-specific | Dual layer transmission (port 7 or 8), or single antenna port, port 7 or 8 |

The use of the DCI format is divided into the following table.

TABLE 3

| DCI format | Contents |
|---|---|
| DCI format 0 | Used for PUSCH scheduling |
| DCI format 1 | Used for scheduling one PDSCH codeword |
| DCI format 1A | Used for compact scheduling of one PDSCH codeword and random access procedure |
| DCI format 1B | Used for compact scheduling of one PDSCH codeword including precoding information |
| DCI format 1C | Used for very compact scheduling of one PDSCH codeword |
| DCI format 1D | Used for precoding and compact scheduling of one PDSCH codeword including power offset information |
| DCI format 2 | Used for PDSCH scheduling UEs setup as closed-loop spatial multiplexing |
| DCI format 2A | Used for PDSCH scheduling UEs setup as open-loop spatial multiplexing |
| DCI format 3 | Used for transmitting PUCCH having 2 bit power adjustments and TPC command of PUSCH |
| DCI format 3A | Used for transmitting PUCCH having 1 bit power adjustments and TPC command of PUSCH |

The uplink channels include a PUSCH, a PUCCH, an SRS (Sounding Reference Signal), and a PRACH (physical random access channel).

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 6:
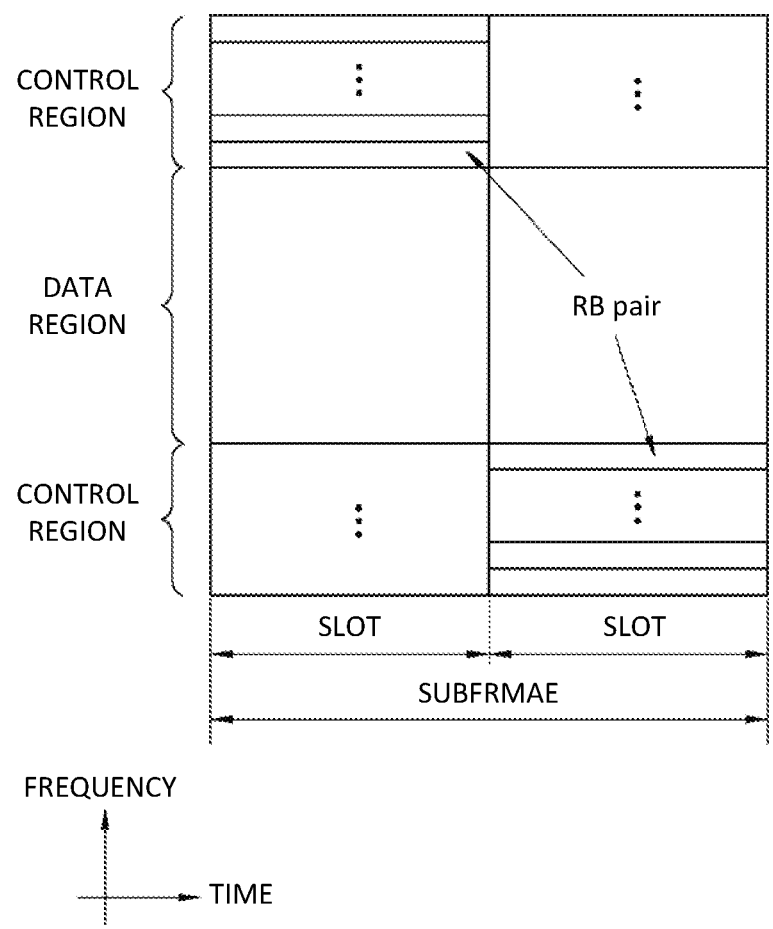
FIG. 6 illustrates the architecture of an uplink sub-frame in 3GPP LTE.

FIG. 6 Illustrates the Architecture of an Uplink Sub-Frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information.

<Carrier Aggregation (CA)>

A carrier aggregation system is now described.

Figure 7:
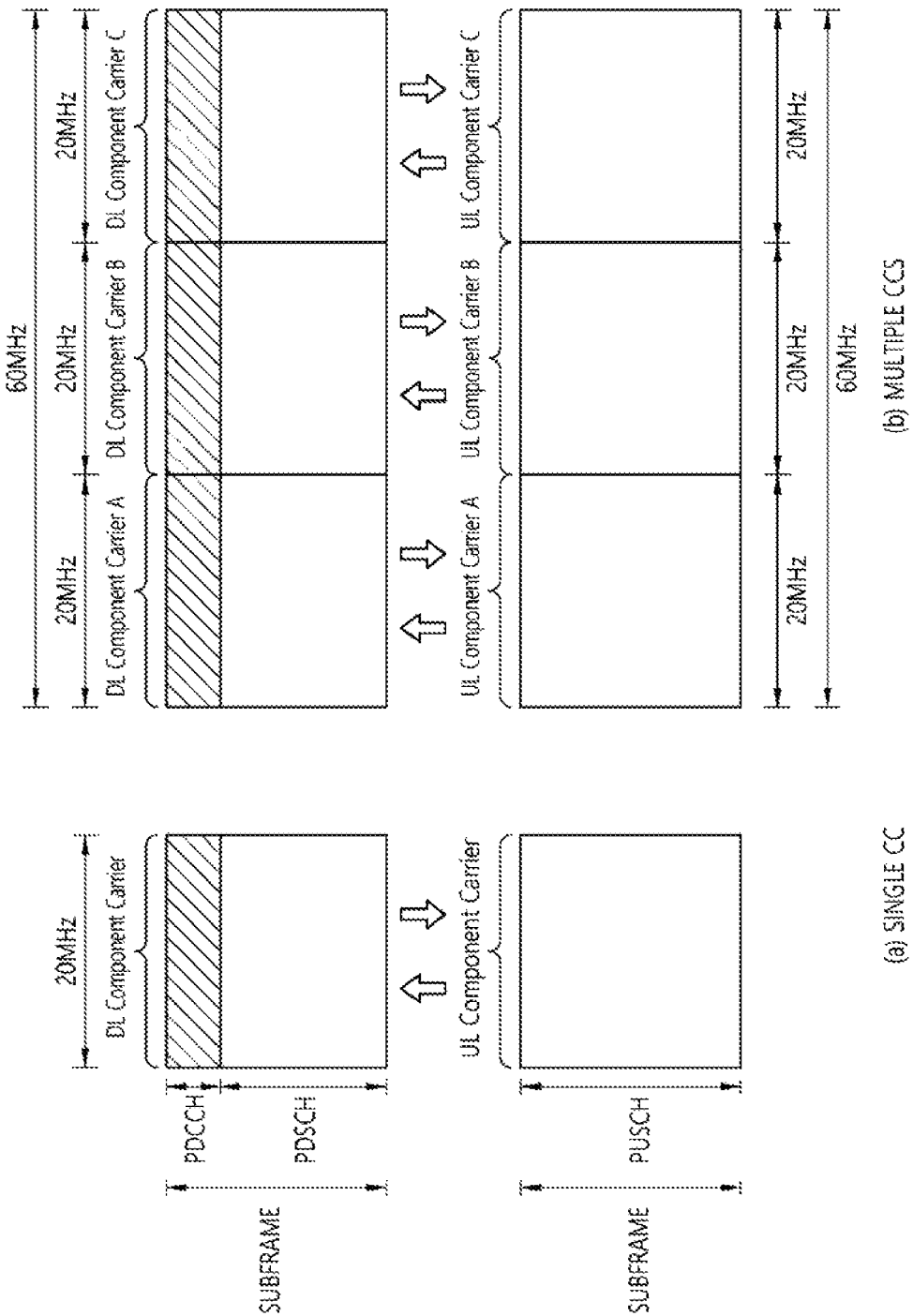
FIG. 7 illustrates an example of comparison between a single carrier system and a carrier aggregation system.

FIG. 7 Illustrates an Example of Comparison Between a Single Carrier System and a Carrier Aggregation System.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
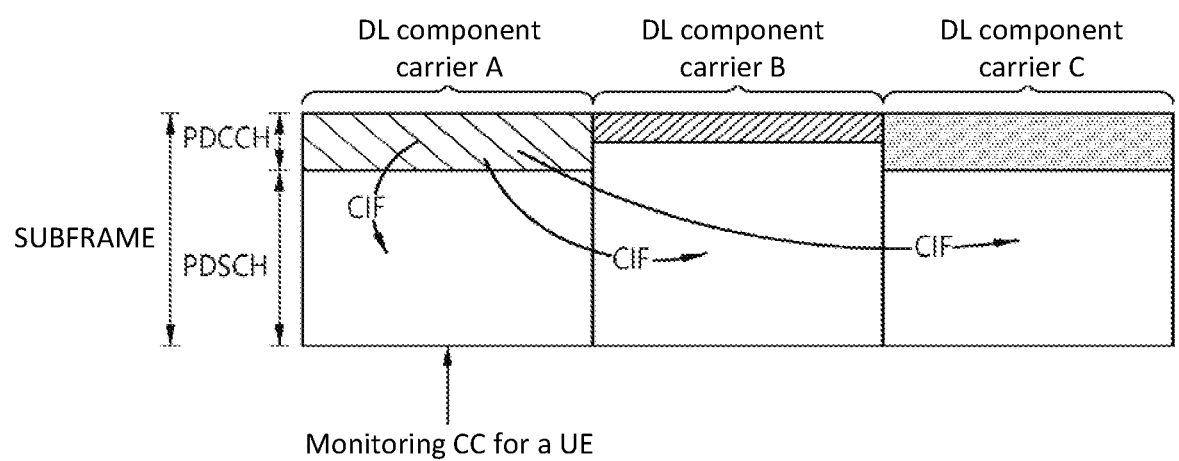
FIG. 8 exemplifies cross-carrier scheduling in the carrier aggregation system.

FIG. 8 Exemplifies Cross-Carrier Scheduling in the Carrier Aggregation System.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

<Reference Signal (RS)>

Meanwhile, the reference signal is hereinafter described.

Generally, transmission information, e.g., data, may be prone to be distorted or varied while transmitted through a wireless channel. Accordingly, a reference signal is required to demodulate the transmission information without errors. The reference signal is a signal previously known between the transmitter and the receiver and is transmitted together with transmission information. Since transmission information transmitted from the transmitter goes through a channel corresponding to each transmission antenna or layer, the reference signal may be allocated per transmission antenna or layer. The reference signal per transmission antenna or layer may be differentiated using resources, such as time, frequency, or code. The reference signal may be used for two purposes, i.e., demodulation and channel estimation of transmission information.

In general, the reference signal is transmitted as a sequence. The reference signal sequence may be any sequence without any particular limitation. As the reference signal sequence, a sequence generated through a computer based on phase shift keying (PSK) (i.e., a PSK-based computer generated sequence) may be used. The PSK may include, for example, binary phase shift keying (BPSK), quadrature phase shift keying (QPSK), and the like. Or, as the reference signal sequence, a constant amplitude zero auto-correlation (CAZAC) may be used. The CAZAC sequence may include, for example, a Zadoff-Chu (ZC)-based sequence, a ZC sequence with cyclic extension, a ZC sequence with truncation, and the like. Also, as the reference signal sequence, a pseudo-random (PN) sequence may be used. The PN sequence may include, for example, an m-sequence, a sequence generated through a computer, a gold sequence, a Kasami sequence, and the like. Also, a cyclically shifted sequence may be used as the reference signal sequence.

A reference signal can be classified into a cell-specific reference signal (CRS), an MBSFN reference signal, and a user equipment-specific reference signal (UE-specific RS). The CRS is transmitted to all the UEs within a cell and used for channel estimation. The MBSFN reference signal can be transmitted in subframes allocated for MBSFN transmission. The UE-specific reference signal is received by a specific UE or a specific UE group within a cell, and may be referred to a dedicated RS (DRS). The DRS is chiefly used by a specific UE or a specific UE group for the purpose of data demodulation.

Further, reference signals may be classified depending on uses. For example, a reference signal used for data demodulation is denoted a demodulation RS (DM-RS). A reference signal used for feedback information indicating a channel state, such as CQI/PMI/RI, is denoted a CSI-RS (channel state indicator-RS). The DRS may be used as a DM-RS.

First, a CRS is described.

Figure 9:
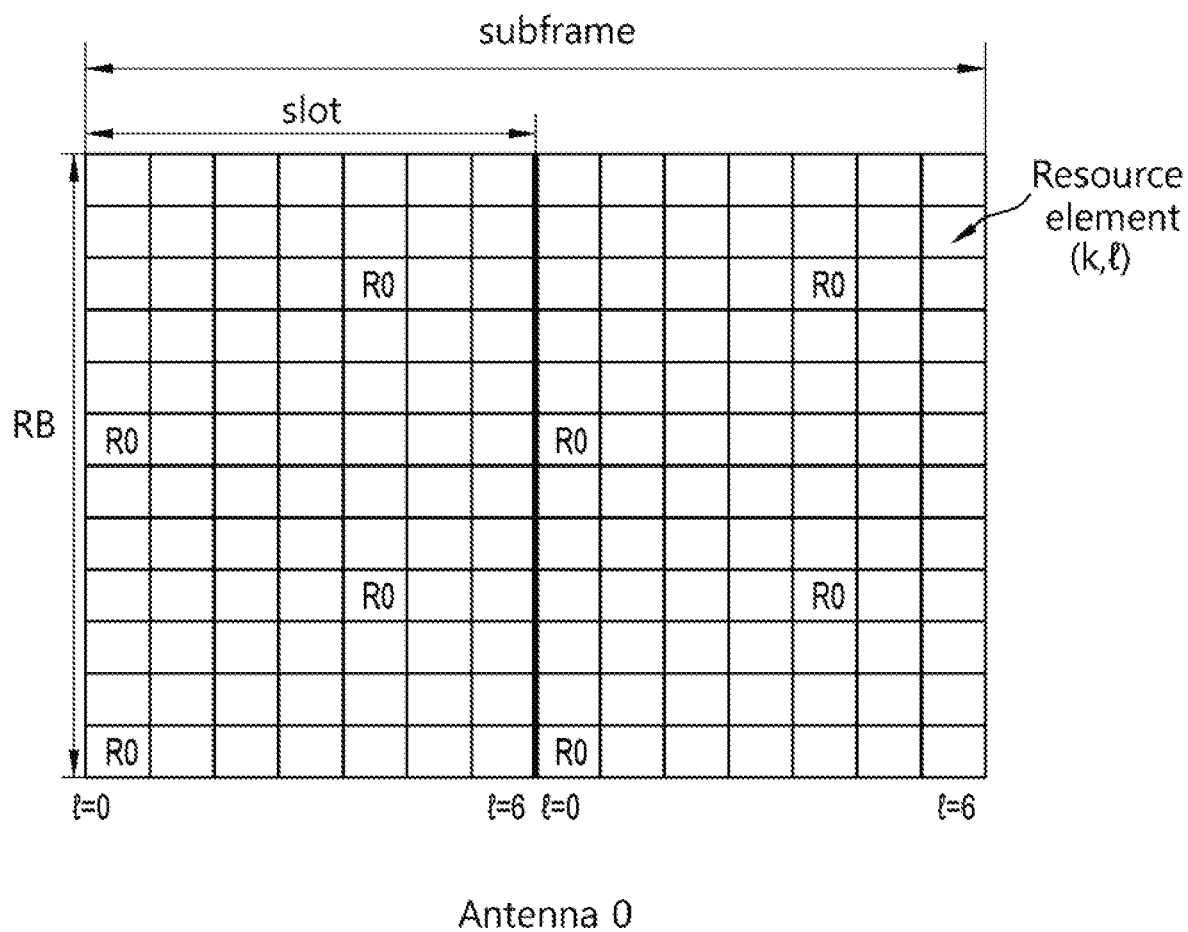
FIGS. 9 to 11 show some exemplary CRS structures according to the number of antennas.
Figure 10:
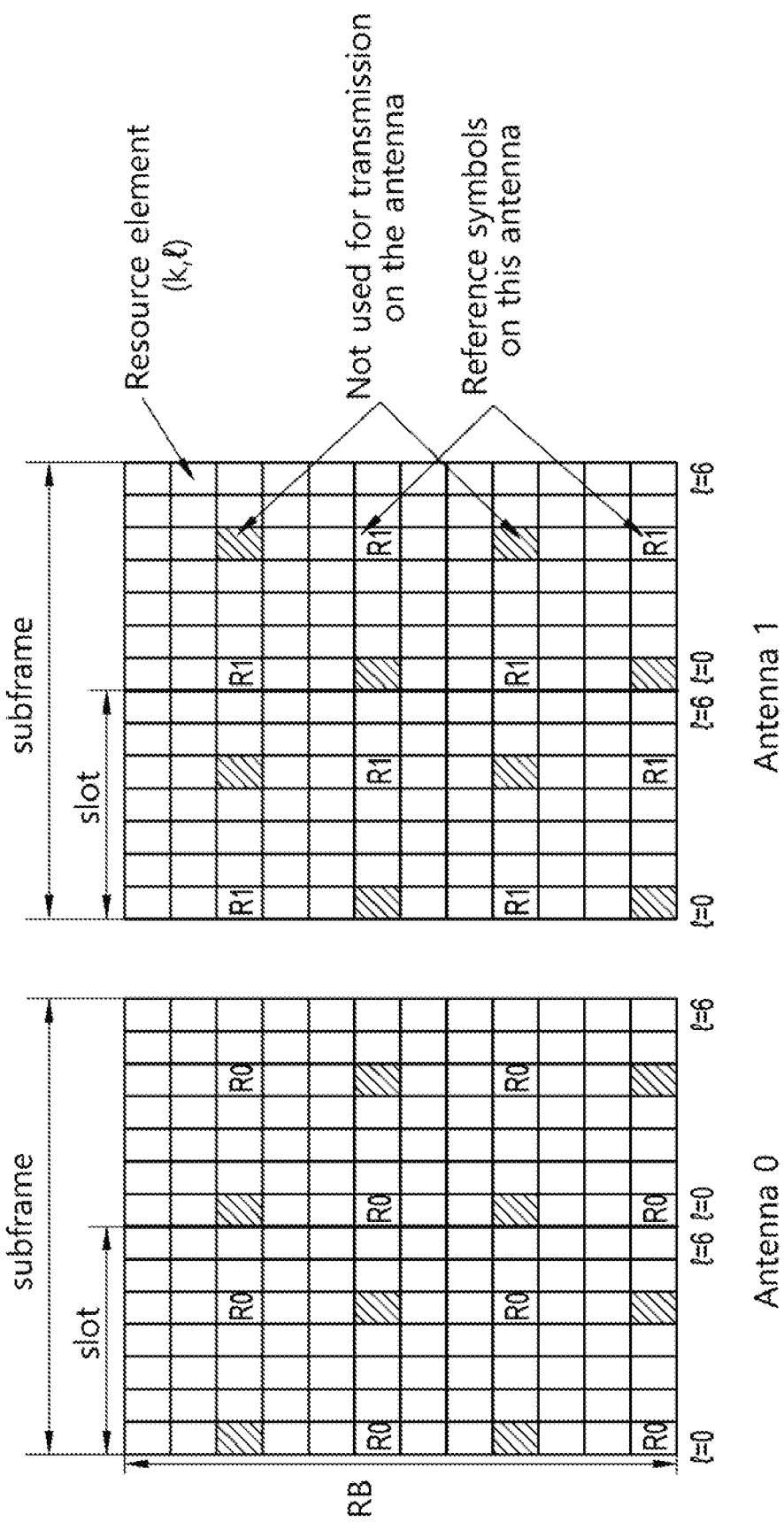
Figure 11:
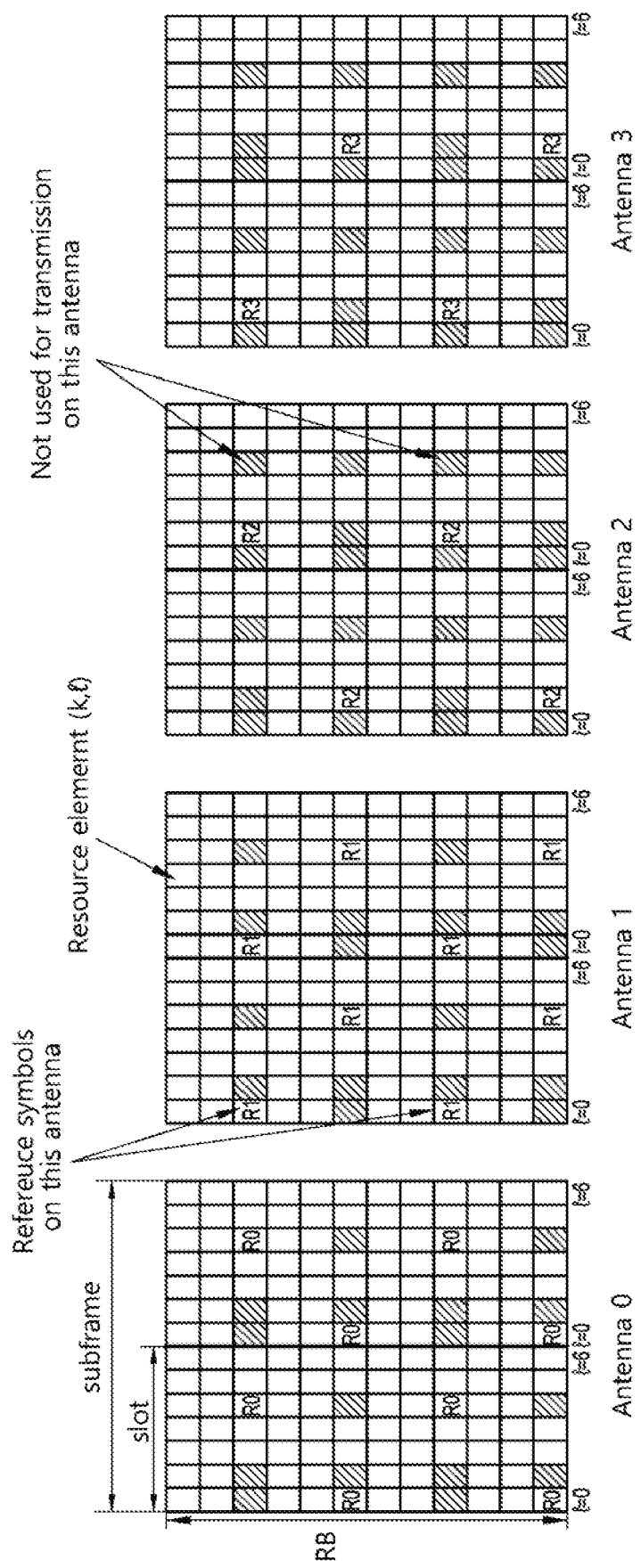

FIGS. 9 to 11 Show Some Exemplary CRS Structures According to the Number of Antennas.

FIG. 9 shows an exemplary CRS structure when a BS uses one antenna. FIG. 10 shows an exemplary CRS structure when a BS uses two antennas. FIG. 11 shows an exemplary CRS structure when a BS uses four antennas. The section 6.10.1 of 3GPP TS 36.211 V8.2.0 (2008-03) may be incorporated herein by reference. In addition, the exemplary CRS structure may be used to support a feature of an LTE-A system. Examples of the feature of the LTE-A system include coordinated multi-point (CoMP) transmission and reception, spatial multiplexing, etc. Furthermore, the CRS maybe used for channel quality estimation, CP detection and time/frequency synchronization.

Referring to FIG. 9 to FIG. 11, in multi-antenna transmission, a BS uses a plurality of antennas, each of which has one resource grid. 'R0' denotes an RS for a first antenna, 'R1' denotes an RS for a second antenna, 'R2' denotes an RS for a third antenna, and 'R3' denotes an RS for a fourth antenna. R0 to R3 are located in a subframe without overlapping with one another. l indicates a position of an OFDM symbol in a slot. In case of a normal cyclic prefix (CP), l has a value in the range of 0 to 6. In one OFDM symbol, RSs for the respective antennas are located with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The CRS is always transmitted by the number of antennas irrespective of the number of streams. The CRS has an independent RS for each antenna. A frequency-domain position and a time-domain position of the CRS in a subframe are determined irrespective of a UE. A CRS sequence to be multiplied to the CRS is generated also irrespective of the UE. Therefore, all UEs in a cell can receive the CRS. However, a position of the CRS in the subframe and the CRS sequence may be determined according to a cell identifier (ID). The time-domain position of the CRS in the subframe may be determined according to an antenna number and the number of OFDM symbols in a resource block. The frequency-domain position of the CRS in the subframe may be determined according to an antenna number, a cell ID, an OFDM symbol index l, a slot number in a radio frame, etc.

The CRS sequence may be applied on an OFDM symbol basis in one subframe. The CRS sequence may differ according to a cell ID, a slot number in one radio frame, an OFDM symbol index in a slot, a CP type, etc. The number of RS subcarriers for each antenna on one OFDM symbol is 2. When a subframe includes NRB resource blocks in a frequency domain, the number of RS subcarriers for each antenna on one OFDM symbol is 2×NRB. Therefore, a length of the CRS sequence is 2×NRB.

Equation 1 shows an example of a CRS sequence r(m).

$$r(m) = \frac{1}{\sqrt{2}}(1 - 2 \cdot c(2m)) + j\frac{1}{\sqrt{2}}(1 - 2 \cdot c(2m+1))$$ [Equation 1]

Herein, m is 0, 1, . . . , $2N_{RB}^{max}-1$. $N_{RB}^{max}$ denotes the number of resource blocks corresponding to a maximum bandwidth. For example, when using a 3GPP LTE system, $N_{RB}^{max}$ is 110. c(i) denotes a PN sequence as a pseudo-random sequence, and can be defined by a gold sequence having a length of 31. Equation 2 shows an example of a gold sequence c(n).

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$ [Equation 2]

Herein, NC is 1600, $x_1(i)$ denotes a 1st m-sequence, and $x_2(i)$ denotes a 2nd m-sequence. For example, the 1st m-sequence or the 2nd m-sequence can be initialized for each OFDM symbol according to a cell ID, a slot number in one radio frame, an OFDM symbol index in a slot, a CP type, etc.

In case of using a system having a bandwidth narrower than $N_{RB}^{max}$, a certain part with a length of $2×N_{RB}$ can be selected from an RS sequence generated in a length of $2×N_{RB}^{max}$.

The CRS may be used in the LTE-A system to estimate channel state information (CSI). If necessary for estimation of the CSI, channel quality indicator (CQI), a precoding matrix indicator (PMI), a rank indicator (RI), or the like may be reported from the UE.

The CSI-RS is now described.

FIG. 12 Illustrates an Example of a Structure of the CSI-RS.

A CSI-RS is used for channel measurement for generation of channel information and channel estimation on a PDSCH of an LTE-A UE. CSI-RSs are relatively sparsely arranged in the frequency region or time region, and may be punctured in the data region of a normal sub-frame or MBSFN sub-frame. When necessary through CSI estimation, CQI, PMI, and RI may be reported from the UE.

CSI-RSs are transmitted through one, two, four, or eight antenna ports. The antenna ports used here are p=15, p=15, 16, p=15, . . . , 18 and p=15, . . . , 22, respectively. That is, CSI-RSs may be transmitted through one, two, four, and eight antenna ports. See 3GPP (3rd Generation Partnership Project) TS 36.211 V10.1.0 (2011-03) "Technical Specification Group Radio Access Network; Evolved Universal Terrestrial Radio Access (E-UTRA); Physical channels and modulation (Release 8)," Ch. 6.10.5 for the CSI-RS.

In transmission of a CSI-RS, up to 32 different configurations may be proposed to reduce inter-cell interference (ICI) in a multi-cell environment including a heterogeneous network (HetNet) environment. The configuration of the CSI-RS may be varied depending on the number of antenna ports in the cell and CP, and a neighboring cell may have a configuration as different as possible. Further, CSI-RS configurations may be divided depending on the frame structure into ones applied to both the FDD frame and TDD frame and ones applied only to the TDD frame. A plurality of CSI-RS configurations in one cell may be used. Zero or one CSI-RS configuration for UEs assuming non-zero power CSI-RSs and 0 or several CSI-RS configurations for UEs assuming zero power CSI-RSs may come in use.

The CSI-RS configurations may be indicated by a higher layer. For example, a CSI-RS-Config IE (information element) transmitted through a higher layer may indicate a CSI-RS configuration. Table 4 shows an example of CSI-RS-Config IE.

TABLE 4

```
CSI-RS-Config-r10 ::=    SEQUENCE {
        csi-RS-r10              CHOICE {
            release                 NULL,
            setup                   SEQUENCE {
                antennaPortsCount-r10       ENUMERATED {an1, an2, an4, an8},
                resourceConfig-r10          INTEGER (0..31),
                subframeConfig-r10          INTEGER (0..154),
                p-C-r10                     INTEGER (-8..15)
            }
        }                                               OPTIONAL,    -- Need ON
        zeroTxPowerCSI-RS-r10   CHOICE {
            release                 NULL,
            setup                   SEQUENCE {
```

TABLE 4-continued

```
                zeroTxPowerResourceConfigList-r10    BIT STRING (SIZE (16)),
                zeroTxPowerSubframeConfig-r10        INTEGER (0..154)
            }
        }                               OPTIONAL              -- Need ON
}
-- ASN1STOP
```

Referring to Table 4, the 'antennaPortsCount' field indicates the number of antenna ports used for transmission of a CSI-RS. The 'resourceConfig' field indicates a CSI-RS configuration. The 'SubframeConfig' field and 'zeroTxPowerSubframeConfig' field indicate sub-frame configurations where a CSI-RS is transmitted.

The 'zeroTxPowerResourceConfigList' field indicates a zero-power CSI-RS configuration. The CSI-RS configurations corresponding to bits set to 1's in the bitmap of 16 bits constituting the 'zeroTxPowerResourceConfigList' field may be set as zero-power CSI-RSs.

A sequence rl,ns(m) for CSI-RS may be generated as in the following equation.

$$r_{l,n_s}(m) = \frac{1}{\sqrt{2}}(1 - 2 \cdot c(2m)) + j\frac{1}{\sqrt{2}}(1 - 2 \cdot c(2m + 1)),$$ [Equation 3]

$$m = 0, \ldots, N_{RB}^{max,DL} - 1$$

where, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In Equation 3, ns is a slot number in the radio frame, and l is an OFDM symbol number in the slot. c(i) is a pseudo random sequence and is started at each OFDM symbol with $c_{init}$ indicated in Equation 3. $N_{ID}^{cell}$ means a physical cell ID.

In sub-frames configured to transmit CSI-RSs, the reference signal sequence $r_{l,n_s}(m)$ is mapped to a complex value modulation symbol $a_{k,l}(p)$ used as a reference symbol for antenna port p.

The relationship between $r_{l,n_s}(m)$ and $a_{k,l}(p)$ is given as in the following equation.

$$a_{k,l}^{(p)} = w_{l''} \cdot r(m)$$ [Equation 4]

where, $$k = k' + 12m +$$

$$\begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \\ -0 & \text{for } p \in \{15, 16\}, \text{extended cyclic prefix} \\ -3 & \text{for } p \in \{17, 18\}, \text{extended cyclic prefix} \\ -6 & \text{for } p \in \{19, 20\}, \text{extended cyclic prefix} \\ -9 & \text{for } p \in \{21, 22\}, \text{extended cyclic prefix} \end{cases}$$

$$l = l' + \begin{cases} l'' & CSI \text{ reference signal configurations 0-19,} \\ & \text{normal cyclic prefix} \\ 2l'' & CSI \text{ reference signal configurations 20-31,} \\ & \text{normal cyclic prefix} \\ l'' & CSI \text{ reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In the Equation, (k', l') and ns are given in Tables 2 and 3 described below. A CSI-RS may be transmitted in a downlink slot where ($n_s$ mod 2) meets the conditions in Tables 2 and 3 to be described below (where, 'mod' means modular computation. That is, ($n_s$ mod 2) means the remainder obtained by dividing ns by 2).

Table 5 represents a CSI-RS configuration in normal CP, and Table 6 represents a CSI-RS configuration in extended CP.

TABLE 5

| | | Number of configured CSI-RSs | | | | | |
|---|---|---|---|---|---|---|---|
| | CSI-RS | 1 or 2 | | 4 | | 8 | |
| | configuration index | (k', l') | $n_s$ mod 2 | (k', l') | $n_s$ mod 2 | (k', l') | $n_s$ mod 2 |
| TDD and | 0 | (9, 5) | 0 | (9, 5) | 0 | (9, 5) | 0 |
| FDD | 1 | (11, 2) | 1 | (11, 2) | 1 | (11, 2) | 1 |
| frames | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |

TABLE 5-continued

| | CSI-RS configuration index | Number of configured CSI-RSs | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| TDD frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 6

| | CSI-RS configuration index | Number of configured CSI-RSs | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD and FDD frames | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| TDD frame | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

The UE may transmit CSI-RSs only in the downlink slot meeting the condition of ns mod 2 in Tables 5 and 6. Further, the UE abstains from transmitting CSI-RSs in a special sub-frame of a TDD frame, a sub-frame where CSI-RS transmission collides with a synchronization signal, PBCH (physical broadcast channel), and system information block type 1 (SystemInformationBlockType1) or a sub-frame where a paging message is transmitted. Further, in a set S, where S={15}, S={15, 16}, S={17, 18}, S={19, 20} or S={21, 22}, a resource element where a CSI-RS of one antenna port is transmitted is not used for transmission of a CSI-RS of another antenna port.

Below table shows an example of a configuration of a sub-frame where a CSI-RS is transmitted.

TABLE 7

| CSI-RS-SubframeConfig ICSI-RS | CSI-RS period TCSI-RS (sub-frame) | CSI-RS sub-frame offset ΔCSI-RS (subframes) |
|---|---|---|
| 0-4 | 5 | ICSI-RS |
| 5-14 | 10 | ICSI-RS − 5 |
| 15-34 | 20 | ICSI-RS − 15 |
| 35-74 | 40 | ICSI-RS − 35 |
| 75-154 | 80 | ICSI-RS − 75 |

Referring to above table, depending on the CSI-RS sub-frame configuration (ICSI-RS), the period (TCSI-RS) of the sub-frame where CSI-RSs are transmitted and an offset (ΔCSI-RS) may be determined. The CSI-RS sub-frame configuration in Table 4 may be one of the 'SubframeConfig' field or 'ZeroTxPowerSubframeConfig' field of the CSI-RS-Config IE in Table 1. The CSI-RS sub-frame configuration may be separately made for non-zero power CSI-RSs and zero power CSI-RSs.

Generally, when the number of reference signals (RSs) increases, the performance of channel estimation is improved. However, when the number of RSs increases, the portion of resource elements (REs) allocated for RSs in a subframe grows by an increased number of RSs, so that data transmission rate is reduced. Therefore, it is not easy to determine to assign additional REs for additional RSs.

Meanwhile, when a UE located in a fast-moving environment or an environment with a poor channel state receives data based on only a conventionally defined RS, the UE has a limitation of being unable to exhibit proper data receiving performance due to deteriorated channel estimation.

<Disclosure of the Present Specification>

Therefore, the present specification suggests a method for performing enhanced channel estimation in a fast-moving environment or an environment with a poor channel state and for minimizing a decrease in transmission rate caused by the overheads for the transmission of an RS.

More specifically, the present specification suggests an additional RS that is capable of serving as an RS for a UE that needs an additional RS (that is, UE located in a fast-moving environment or an environment with a poor channel state) and may not serve as an RS for a UE that needs no additional RS. In the following description, the additional RS suggested in the present specification is referred to as an Assisted-RS (A-RS).

A UE located in a fast-moving environment or an environment with a poor channel state uses an A-RS as an additional RS. That is, the UE uses both a conventional RS (for example, a common RS (CRS)) and an A-RS to improve channel estimation and data reception performance.

A UE located in a general environment receives data (for example, PDSCH) multiplexed in A-RS allocated REs. A UE located in a specific cell may know about an A-RS in advance in the cell. Therefore, the UE located in the general environment may receive data by removing the A-RS from the A-RS allocated REs. In this case, since the UE does not separately estimate the A-RS, complexity in data reception is not substantially increased. That is, even though the A-RS is additionally used, an increase in overheads for an RS of the UE located in the general environment may be minimized.

In order that a UE located in a fast-moving environment or an environment with a poor channel state additionally uses an A-RS to perform channel estimation and a UE located in a general environment removes the A-RS from A-RS allocated REs, a BS may transmit an indication on whether to use the A-RS to the UEs. The BS may transmit an indicator on whether to use the A-RS through a radio resource control (RRC) broadcast signal or RRC dedicated signal. In this case, the indicator on whether to use the A-RS may be a 1-bit indicator. Further, the BS may transmit the level of A-RS transmission power (for example, PD) through an SIB2 message.

The following table illustrates one example of A-RS-Config for an A-RS.

TABLE 8

```
A-RS-Config-rXX ::=    SEQUENCE {
       a-RS-rXX            CHOICE {
            release              NULL,
            setup                SEQUENCE {
                 structureTyep-rXX          INTEGER (0..2),
                 antennaPortsCount-rXX      ENUMERATED {an1, an2, an4},
                 resourceConfig-rXX         INTEGER (0..7),
                 p-D-rXX                    INTEGER (−8..15)
            }
       }                                     OPTIONAL,       -- Need ON
}
```

The A-RS may have a structure of being added a cell-specific RS. Further, the A-RS may be formed in a new structure that is not conventionally defined in LTE or in a modification of the structure of an RS conventionally defined in LTE. Although the structure of the A-RS is described based on the structure of a CSI-RS conventionally defined in LTE in the present specification, the A-RS may also have a new structure, without being limited thereto.

The A-RS according to the present specification may be defined as below.

1. A-RS Structure Type 1

TABLE 9

| Antenna Port | A-RS configuration | CSI-RS configuration | (k', l') | $n_s$ mod 2 |
|---|---|---|---|---|
| Antenna port 31, 32 | 0 | 0 | (9, 5) | 0 |
| | 1 | 2 | (9, 2) | 1 |
| | 2 | 10 | (3, 5) | 0 |
| | 3 | 14 | (3, 2) | 1 |
| Antenna port 33, 34 | 4 | 5 | (8, 5) | 0 |
| | 5 | 7 | (8, 2) | 1 |
| | 6 | 11 | (2, 5) | 0 |
| | 7 | 15 | (2, 2) | 1 |

2. A-RS Structure Type 2

TABLE 10

| Antenna Port | A-RS configuration | CSI-RS configuration | (k', l') | $n_s$ mod 2 |
|---|---|---|---|---|
| Antenna port 31, 32 | 0 | 0 | (9, 5) | 0 |
|  | 1 | 2 | (9, 2) | 1 |
| Antenna port 33, 34 | 4 | 5 | (8, 5) | 0 |
|  | 5 | 7 | (8, 2) | 1 |

3. A-RS Structure Type 3

TABLE 11

| Antenna Port | A-RS configuration | CSI-RS configuration | (k', l') | $n_s$ mod 2 |
|---|---|---|---|---|
| Antenna port 31, 32 | 0 | 0 | (9, 5) | 0 |
| Antenna port 33, 34 | 4 | 5 | (8, 5) | 0 |

The A-RS structure types in Table 9 to Table 11 may be selected by a BS according to a network environment. The BS may signal information on a selected A-RS structure type to a UE through an RRC message.

Further, an A-RS sequence rl,ns(m) may be mapped to a complex-valued modulation symbol ak,l(p) used as a reference symbol for an antenna port p.

A relationship between rl,ns(m) of the A-RS and ak,l(p) is represented by the following equation.

$$a_{k,l}^{(p)} = w_{l''} \cdot r_{l,n_s}(m'), \quad r_{l,n_s}: RS\ squence \quad \text{[Equation 5]}$$

Here, $$k = k' + 12m$$

$$l = l' + l''$$

$$w_{l''} = \begin{cases} 1 & p \in \{31, 33\} \\ (-1)^{l''} & p \in \{32, 34\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Figure 13:
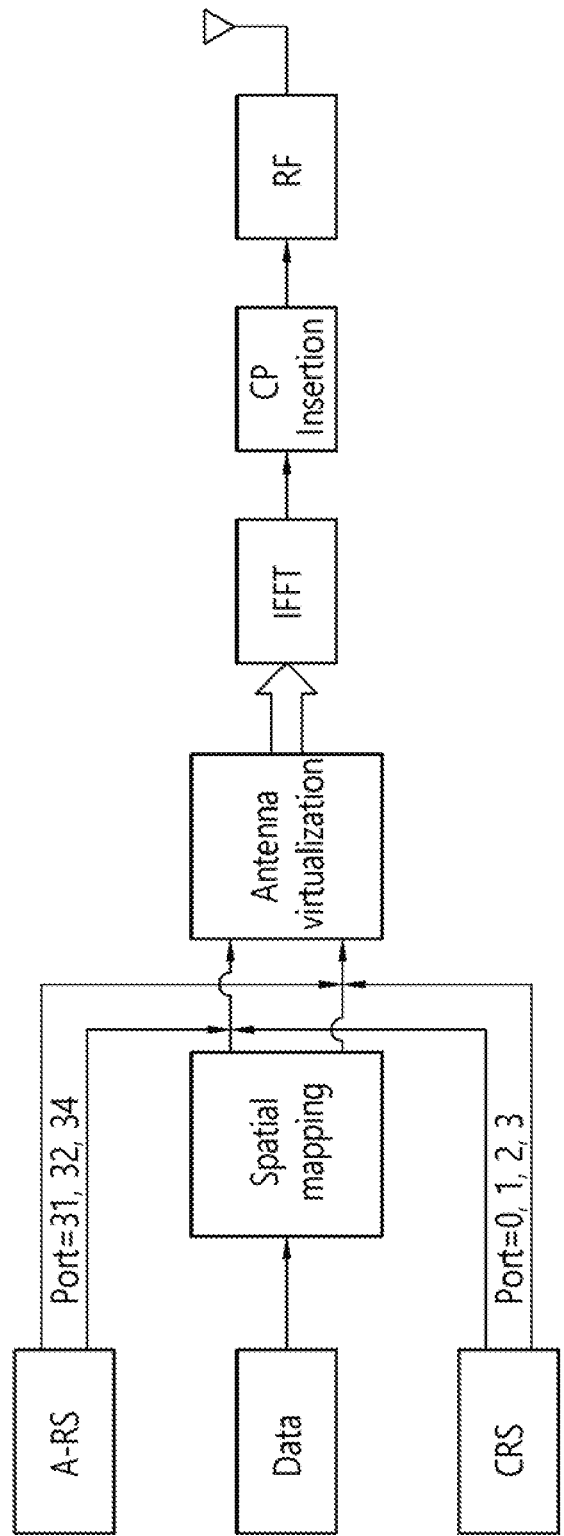
FIG. 13 illustrates an example of an antenna virtualization structure for an A-RS according to one disclosure of the present specification.

FIG. 13 Illustrates an Example of an Antenna Virtualization Structure for an A-RS According to One Disclosure of the Present Specification.

As illustrated in FIG. 13, antenna virtualization for an A-RS may use an antenna virtualization structure, such as a CRS.

FIG. 14 Illustrates an RS Structure for an Antenna Port of A-RS Structure Type 1 According to One Disclosure of the Present Specification.

FIG. 14 shows one resource grid for each antenna port. Here, 'R31' denotes an RS for a 31st antenna port, 'R32' denotes an RS for a 32nd antenna port, 'R33' denotes an RS for a 33rd antenna port, and 'R34' denotes an RS for a 34th antenna port. The positions of R31 to R34 in a subframe do not overlap each other. l is the position of an OFDM symbol in a slot and has a value ranging from 0 to 6 in a normal CP.

The 31st antenna port to the 34th antenna port may be defined as quasi-co-located (QCL) type A with a 0th antenna port to a third antenna port.

Hereinafter, an operation of a UE according to an A-RS is described.

1. Operation of UE Using A-RS

A UE located in a fast-moving environment or an environment with a poor channel state may use an A-RS. Although using the A-RS, the UE performs radio resource measurement (RRM) based on a conventional RS or CSI-RS excluding the A-RS. The UE using the A-RS may perform channel estimation and demodulation using the conventional RS and A-RS.

Figure 15:
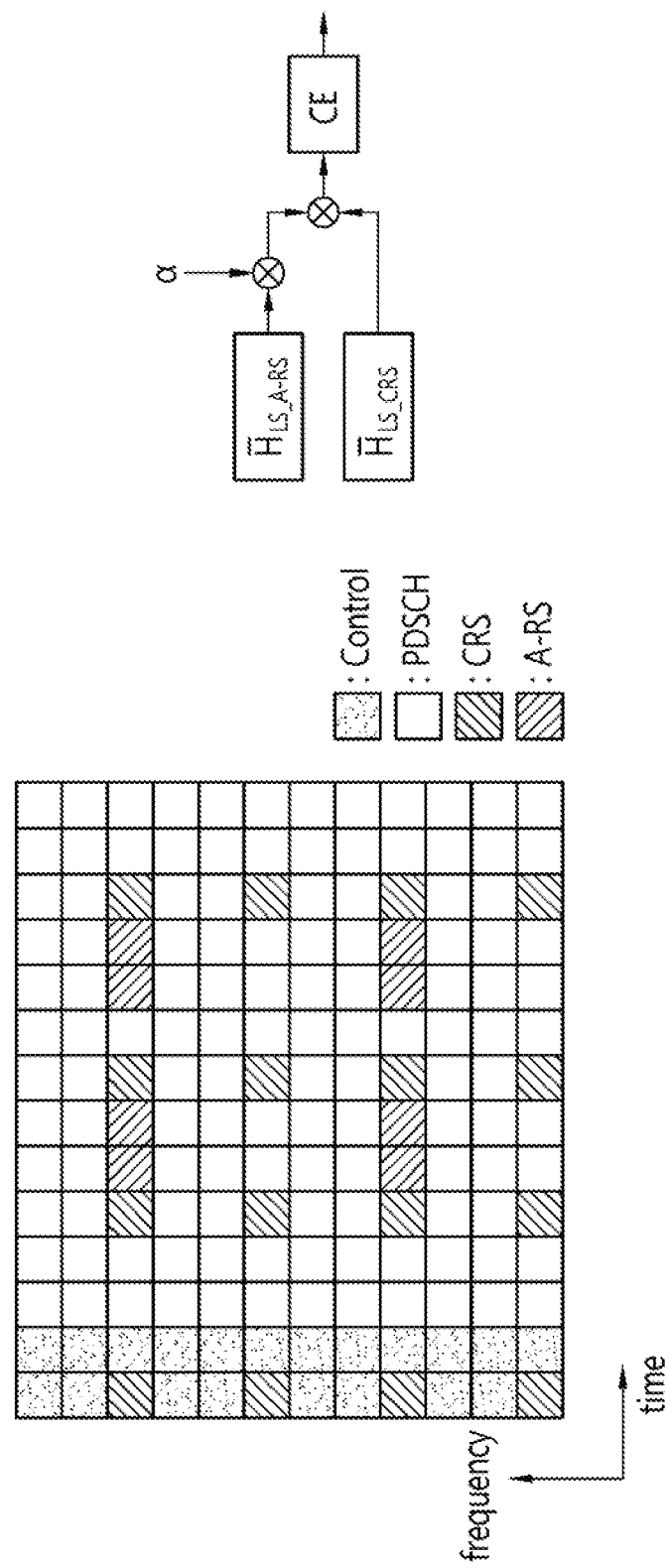
FIG. 15 illustrates an example of a channel estimation method of a UE using an A-RS according to one disclosure of the present specification.

FIG. 15 Illustrates an Example of a Channel Estimation Method of a UE Using an A-RS According to One Disclosure of the Present Specification.

Referring to FIG. 15, the UE may obtain a channel estimate ($\hat{H}_{LS\_CRS}$) in a CRS allocated RE and a channel estimate ($\hat{H}_{LS\_A-RS}$) in an A-RS allocated RE and may calculate a time/frequency channel value for the entire channel based on the obtained channel estimates. Meanwhile, a BS may transmit an A-RS through power boosting in order to improve channel estimation of the A-RS. In this case, the UE may further apply a weight (a) to the channel estimate ($\hat{H}_{LS\_A-RS}$) in the A-RS allocated RE according to power boosting of the A-RS, thereby calculating a time/frequency channel value for the entire channel.

2. Operation of UE Using No A-RS

A UE located in a general environment may use no A-RS. The UE using no A-RS naturally performs RRM based on a conventional CRS or CSI-RS excluding an A-RS. The UE using no A-RS receives data mutiplexed to A-RS allocated REs FIG. 16 Illustrates an Example of a Channel Estimation Method of a UE Using No A-RS According to One Disclosure of the Present Specification.

Figure 16:
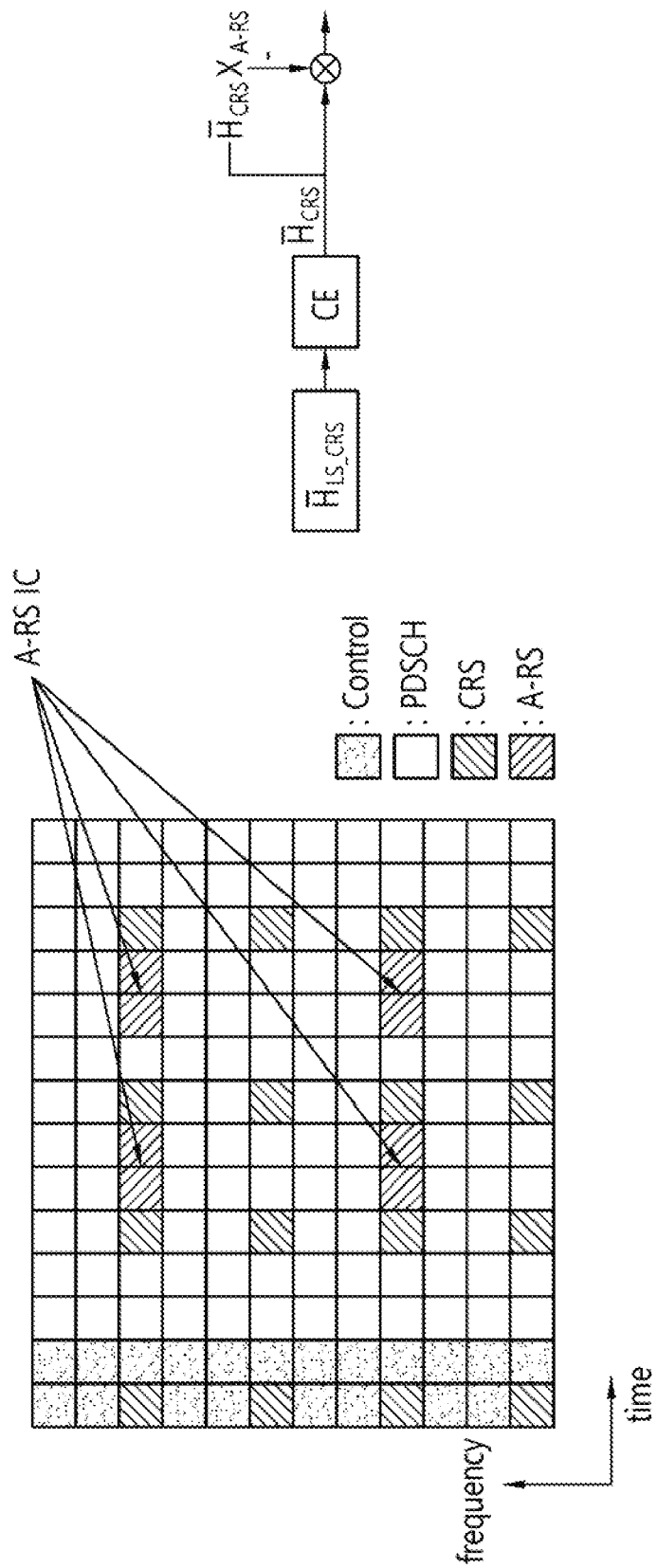
FIG. 16 illustrates an example of a channel estimation method of a UE using no A-RS according to one disclosure of the present specification.

Referring to FIG. 16, the UE performs channel estimation ($\hat{H}$) based on a conventional RS. The UE removes an A-RS from an A-RS allocated RE based on information on the A-RS received from a BS and receives data (for example, PDSCH) from the A-RS removed RE.

The examples described in the present specification is applicable to both FDD and TDD in an extended manner and may be applied as a cell-specific RS in a new radio access technology frame structure that is adoptable in next-generation mobile communication.

Figure 17:
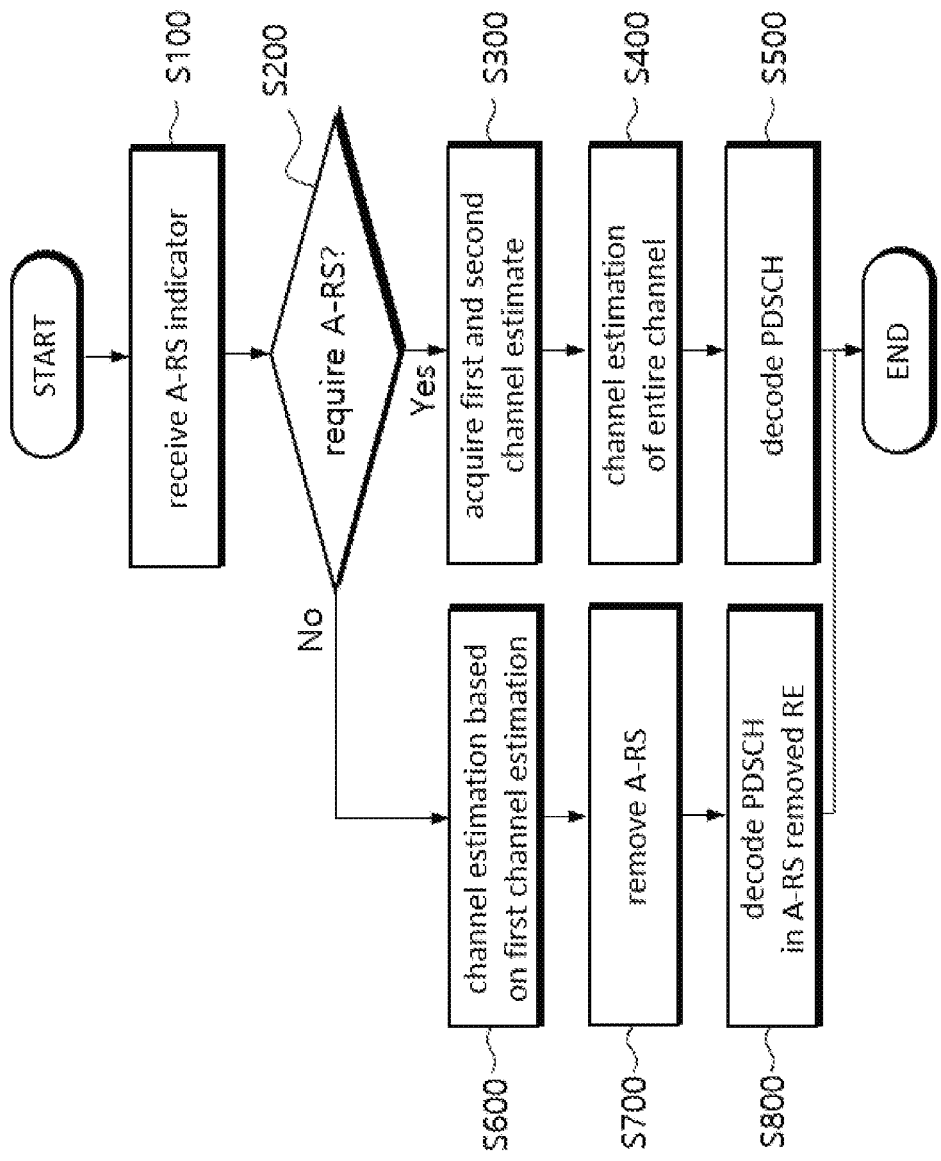
FIG. 17 illustrates a channel estimation method according to one disclosure of the present specification.

FIG. 17 Illustrates a Channel Estimation Method According to One Disclosure of the Present Specification.

Referring to FIG. 17, a UE receives an indicator on whether to use an A-RS through an RRC signal (S100). In this case, the UE may receive the indicator on whether to use the A-RS through any one of an RRC broadcast signal or an RRC dedicated signal.

The UE determines whether the A-RS is required based on the indicator on whether to the A-RS (S200).

When the A-RS is required, the UE acquires a first channel estimate based on a first RS allocated to a first RE of a subframe received from a BS and acquires a second channel estimate based on the A-RS multiplexed with a PDSCH in a second RE (S300). Here, the first RS may be any one of a CRS or a CSI-RS, without being limited thereto.

The UE performs channel estimation of the entire channel based on the first channel estimate and the second channel estimate (S400). In this case, when the A-RS is transmitted through power boosting as compared with the first RS, the UE may perform the channel estimation of the entire channel by applying a weight according to a power boosting level of the A-RS to the second channel estimate. On the other hand, the UE may also perform the channel estimation of the entire channel by equally applying a weight to the first channel estimate and the second channel estimate.

The UE decodes the PDSCH received from the BS using a result of the channel estimation of the entire channel (S500).

On the contrary, when the A-RS is not required, the UE performs the channel estimation of the entire channel based on the first channel estimate, which is acquired based on the first RS allocated to the first RE in the subframe received from the BS (S600).

The UE removes the A-RS from the second RE in which the A-RS is multiplexed along with the PDSCH (S700). In this case, the UE may remove the A-RS from the second RE using information on the A-RS received in advance from the BS.

The UE decodes the PDSCH multiplexed in the A-RS removed second RE using a result of the channel estimation of the entire channel (S800).

The aforementioned embodiments of the present invention can be implemented through various means. For example, the embodiments of the present invention can be implemented in hardware, firmware, software, combinations thereof, or the like, which will be described in detail with reference to the drawing.

Figure 18:
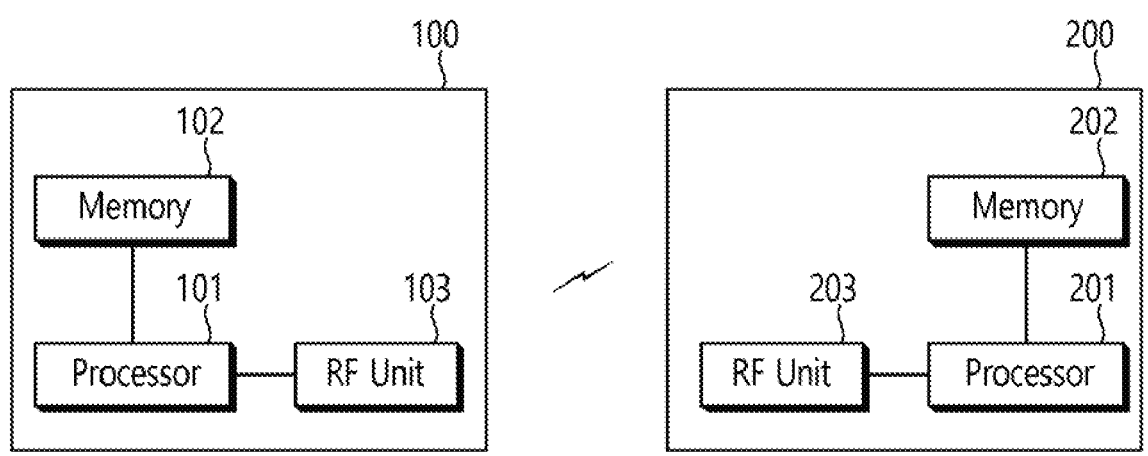
FIG. 18 is a block diagram illustrating a wireless communication system according to an embodiment of the present invention.

FIG. 18 is a Block Diagram Illustrating a Wireless Communication System According to an Embodiment of the Present Invention.

A base station 200 includes a processor 210, a memory 220, and a radio frequency RF unit 230. The memory 220 is connected to the processor 210 to store various information for driving the processor 210. The RF unit 230 is connected to the processor 210 to transmit and/receive a wireless signal. The processor 210 implements a suggested function, procedure, and/or method. An operation of the base station 200 according to the above embodiment may be implemented by the processor 210.

A wireless device 100 includes a processor 110, a memory 110, and an RF unit 130. The memory 120 is connected to the processor 110 to store various information for driving the processor 110. The RF unit 130 is connected to the processor 110 to transmit and/receive a wireless signal. The processor 110 implements a suggested function, procedure, and/or method. An operation of the wireless 100 according to the above embodiment may be implemented by the processor 210.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module procedure, function, and the like to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A channel estimation method of a user equipment (UE), the method comprising:
   receiving, by the UE, first configuration information and second configuration information,
   wherein the first configuration information relates to a channel state information reference signal (CSI-RS), which is allocated to a first resource element of a subframe,
   wherein the second configuration information relates to a second reference signal, which is used for time tracking and is allocated on the same slot of the same subframe as the CSI-RS, and
   wherein at least one antenna port for the second reference signal is the same as at least one antenna port for the CSI-RS;
   estimating a channel state information (CSI) based on the CSI-RS;
   based on the second configuration information, determining whether to remove the second reference signal from the second resource element of the subframe;
   based on a determination result, removing the second reference signal from the second resource element of the subframe; and
   decoding a data signal, which has been multiplexed with the removed second reference signal in the second resource element, based on the estimated CSI.

2. The method of claim 1, further comprising:
   when the second reference signal is not removed based on the determination result, decoding a data signal based on the CSI-RS and the second reference signal.

3. The method of claim 2, wherein the decoding of the data signal comprises performing a channel estimation of an entire channel based on time tracked based on the second reference signal and the estimated CSI.

4. The method of claim 1, wherein the second reference signal is used for a high speed environment.

5. The method of claim 1, wherein the second configuration information is a 1 bit information informing that the second reference signal is to be used.

6. A user equipment (UE) for performing channel estimation, the UE comprising:
   a transceiver to transmit and receive a radio signal; and
   a processor coupled to the transceiver and configured to control the transceiver,
   wherein the processor is further configured to:
   control the transceiver to receive first configuration information and second configuration information,
   wherein the first configuration information relates to a channel state information reference signal (CSI-RS), which is allocated to a first resource element of a subframe,
   wherein the second configuration information relates to a second reference signal, which is used for time tracking and is allocated on the same slot of the same subframe as the CSI-RS,
   wherein the second reference signal is allocated to a second resource element of the subframe, and
   wherein at least one antenna port for the second reference signal is the same as at least one antenna port for the CSI-RS;
   estimate a channel state information (CSI) based on the CSI-RS;
   based on the second configuration information, determine whether to remove the second reference signal from the second resource element of the subframe;

based on a determination result, remove the second reference signal from the second resource element of the subframe; and decode a data signal, which has been multiplexed with the removed second reference signal in the second resource element, based on the estimated CSI.

7. The UE of claim 6, wherein the processor is further configured to decode a data signal based on the CSI-RS and the second reference signal when the second reference signal is not removed based on the determination result.

8. The UE of claim 7, wherein the processor is further configured to perform a channel estimation of an entire channel based on time tracked based on the second reference signal and the estimated CSI.

9. The UE of claim 6, wherein the second reference signal is used for a high speed environment.

10. The UE of claim 6, wherein the second configuration information is a 1 bit information informing that the second reference signal is to be used.

\* \* \* \* \*